United States Patent [19]

Fuchs et al.

[11] 4,141,867
[45] Feb. 27, 1979

[54] COLD CROSS-LINKING DISPERSION ADHESIVE

[75] Inventors: Gundolf Fuchs, Hemmingstedt; Heiko Humbert, Hamburg; Dietrich Pirck, Seevetal, all of Fed. Rep. of Germany

[73] Assignee: Deutsche Texaco Aktiengesellschaft, Hamburg, Fed. Rep. of Germany

[21] Appl. No.: 824,636

[22] Filed: Aug. 15, 1977

[30] Foreign Application Priority Data

Aug. 17, 1976 [DE] Fed. Rep. of Germany ....... 2636970

[51] Int. Cl.² .............................. C08J 3/24; C08K 5/10
[52] U.S. Cl. ............................. 260/23 AR; 260/27 R; 260/29.6 NR; 260/29.6 TA
[58] Field of Search .................. 260/29.6 NR, 23 AR, 260/29.6 TA, 27 R

[56] References Cited

U.S. PATENT DOCUMENTS

| 3,367,893 | 2/1968 | Halbartschlager | 260/29.6 NR |
| 3,582,507 | 6/1971 | Peerman | 260/29.6 NR |

FOREIGN PATENT DOCUMENTS 1643144  5/1971  Fed. Rep. of Germany.

*Primary Examiner*—V. P. Hoke
*Attorney, Agent, or Firm*—Thomas H. Whaley; Carl G. Ries; Henry W. Archer

[57] ABSTRACT

Cold cross-linked polyacrylic acid esters-based dispersion adhesives containing:

(a) a copolymer prepared from, in wt.% 85-50 2-ethyl-hexylacrylate, 0-35 n-butylacrylate, 8-12 acrylonitrile, 2-6 acrylic acid, 0.5-2 acrylamide and/or 0.5-2 hydroxyalkylmethacrylate and, based on the amount of the aforementioned monomers, from 0.2 to 3.0 percent of 2-(α-chloro-acetoxy)-alkyl-acrylate or-methacrylate, (b) 1-5 wt.%, based on the weight of copolymer, of a polyaminoamide comprising terminal amino groups, and optionally (c) rosin, fillers, and/or other adhesive additives.

The adhesives are prepared in the form of an aqueous dispersion having a solids content of from about 40 to 60 wt.% and a viscosity in the range of from 800 to 1000 cPs.

4 Claims, No Drawings

COLD CROSS-LINKING DISPERSION ADHESIVE

BACKGROUND OF THE INVENTION

The invention relates to dispersion adhesives based on polyacrylic acid esters. The known adhesives of this type contain copolymers of acrylic acid esters as the active adhesive with which small amounts of acrylonitrile and acrylic acid are incorporated by polymerisation, so that the nitrile and carboxyl groups impart the adhesion characteristic of the adhesive in the most diverse systems.

Adhesives in the form of aqueous dispersions are used in the building industry, for example, for sticking down floor coverings because, as compared with solvent adhesives, they have a series of advantages. Thus, they can be prepared with higher concentrations of high molecular material, which represents the actual adhesive, are not combustible, are not poisonous and are more economical. Most of these adhesives are aqueous dispersions, with or without filing materials, tackifiers and the like, based polyacrylic acid esters, polyvinylacetate and polyisobutylene.

Dispersion adhesives set after the evaporation of the water. If the cohesive properties, in particular the temperature stability, are to be improved, cross-linking agents must be incorporated in the adhesive system.

STATEMENT OF THE PRIOR ART

According to German Pat. No. 1,594,147 a procedure is described for preparing a cross-linkable copolymer and admixing a cross-linking component, e.g., a resin. The cross-linking takes place only after the addition of a catalyst. German Pat. No. 1,297,270 suggests to incorporate N-methylol-, N-methylether-, halogenhydrin and/or epoxide groups by way of polymerisation into a copolymer of vinylacetate, vinylpropionate and/or acrylate monomers. In many cases cross-linking takes place after the application of the adhesive, but in some cases it is recommended to add a reaction accelerator, such as an acid or a base. Because the cross-linking occurs immediately after admixing a catalyst with an adhesive, adhesive-catalyst systems are unsuitable where large areas are to be treated.

R. Reinecke and W. Schmieder ("Adhasion" 1973 pp 312-316) have proposed to incorporate monochloroacetic acid vinyl ester by polymerisation into the copolymer. The cross-linking takes place after addition of aqueous alkali. Monochloroacetic acid vinyl ester is, however, unobtainable in commerce and because the compound is very unstable it is also unsuitable in practice. German Pat. No. 1,643,144 describes a method of preparing halogenated acrylic acid esters, such as chloroacetoxyethylacrylate. These compounds are recommended as comonomers for the production of elastomers, which can be vulcanized on account of the presence of the reactive halogen.

Previous attempts sought to incorporate in the copolymer, instead of the monochloroacetic acid vinyl ester, the relatively simple prepared and stable chloroacetoxyethyl methacrylate to serve as a reactive monomer and internal cross-linking agent in the copolymer. Nevertheless a disadvantage was that the relation of the open time to the strength of the finished bond was not completely satisfactory. If large amounts of this internal cross-linking agent are built into the copolymer, one obtains dispersion adhesives with short operating time and high strength. If the amounts of chloroacetoxyethylmethacrylate in the copolymer are reduced then the operating time becomes longer, but the strength of the finished bond is poorer.

A similar effect results from a change in the proportion of the two monomers n-butylacrylate and 2-ethylhexalacrylate. A reduction in the n-butylacrylate content led to extended open times but at the same time to reduced tensile shear strength.

The present invention has for object the provision of dispersion adhesives having an extended operating time and resulting in bonds of high strength.

SUMMARY OF THE INVENTION

The invention provides cross-linking dispersion adhesives based on polyacrylic acid esters, which are characterized by an aqueous dispersion comprising:

(a) a copolymer prepared from, in % by weight, 85–50 2-ethyl-hexylacrylate, 0–33 n-butylacrylate, 8–12 acrylonitrile, 2–6 acrylic acid, 0.5–2 acrylamide, and/or 0.5–2 hydroxyalkylmethacrylate and, based on the amount of the above stated monomers, 0.2–3% of 2-($\delta$-chloroacetoxy)alkylacrylate or methacrylate, (b) 1–5% by weight, based on the copolymer, of a polyaminoamide comprising terminal amino groups and having a molecular weight of about 150, and optionally (c) rosin, filler and/or other adhesive additives, the dispersion having a solids content from about 40 to 60 by weight and a viscosity in the range of from 800 to 1000 cPs.

The copolymer which constitutes the adhesive proper, contains an internal cross-linking agent, and in addition to this an external cross-linking agent is added to the copolymer dispersion. In this way it is possible to produce adhesive bonds having extremely good thermal stability and tensile shear strength, but at the same time to ensure an operating time between 5 and 60 minutes, given the condition that the formula be otherwise standard, i.e., it contains the usual quantity of filling materials; because as is known, the quantity of filling materials included in a dispersion adhesive has an important influence upon the open time. A long working time is particularly desirable when laying polyvinylchloride floor coverings over large areas.

For improved efficiency, it is desirable that the entire surface which is to be treated with the adhesive be coated in a single working step, and the bond then made in a further operation. On the other hand, a shorter interval between the application of the adhesive and the making of the bond is desired if rather small surface are to be treated or if repair work is to be carried out.

The copolymer in the adhesive dispersion according to the present invention consist mainly, i.e. up to 85% by weight, of 2-ethylhexylacrylate, of which up to 34% can be replaced by butylacrylate. Acrylonitrile is incorporated by polymerisation in a proportion of 8–12% by weight, preferably 10%, whereby good adhesion is ensured. The copolymer also contains as a monomer unit 2–6%, preferably 5% by weight of acrylic acid and 1.5–3%, preferably 2% by weight of monomer units with hydroxyl groups and/or amino groups, such as acrylic amide, hydroxyethyl or propyl-acrylate or -methacrylate, as well as 0.5 to 1.0% of 2-(2-chloroacetoxy) ethyl-acrylate or -methacrylate as a cross-linking monomer.

Low molecular polyaminoamides are employed as the external cross-linking agent. These are the condensation products of unsaturated aliphatic acids with polyamines. The products are commercially available under the name "Versamid". A more precise definition of the Versamides is found in Rompp (1966); "Chemie-Lexikon" (Encyclopedia of Chemistry) at column 6769:

Versamides : Amber solid polyamides or liquid polyaminoamides or polyaminoimidazolines having a molecular weight of from about 1000 to 8000, obtainable by the condensation of dimerised and trimerised unsaturated fatty acids (mainly linoleic acid) with a polyamines of the general formula:

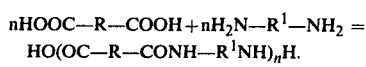

$$nHOOC-R-COOH + nH_2N-R^1-NH_2 = HO(OC-R-CONH-R^1NH)_nH.$$

By the alteration of the alkyl groups R and $R^1$, a number of chemically and physically different types of two main groups are obtained:
(1) Thermoplasts (polyamides);
(2) Reactive Resins (polyaminoamides or polyaminoimidazoline): semi-solid or liquid products, density 0.97–0.99. These types of Versamides contain amino groups still susceptible to reaction and they cross-link with epoxide resins at normal or higher temperatures to give duroplasts as described in (German Pat. No. 952 757). A particularly preferred type is: "Versamid 150". The polyaminoamides are preferably introduced in a proportion of 1–3% by weight based on the copolymer.

The invention, and the advantages which accrue therefrom, is further illustrated in non-limiting fashion by the following examples.

EXAMPLES

General description of the examples:

The examples were carried out with dispersion adhesives, which differed from each other with respect to the proprotion of 2-ethylhexylacrylate (EH) and n-butylacrylate (BU) in the copolymer, as well as in the type and the quantity of the cross-linking agent. In addition to carrying out examples according to the invention there were also carried out, for the purpose of comparison, examples with 2-(2-chloroacetoxy)ethylmethacrylate) as an internal cross-linking agent, that is to say with a cross-linking agent built into the copolymer.

The dispersion adhesives were prepared in all the examples according to the same method. In each case there was prepared a monomer mixture A or B and, separately therefrom, an aqueous phase of the following composition.

| Monomer mixture (G) | A | B |
| --- | --- | --- |
| ethylhexylacrylate (EH) | 425 | 255 |
| n-butylacrylate (BU) | — | 170 |
| acrylnitrile | 50 | 50 |
| acrylic acid | 15 | 15 |
| acrylic acid amide | 5 | 5 |
| hydroxyethylmethacrylate | 5 | 5 |
| EH/BU proportion | 100/00 | 60/40 |
| Aqueous Phase | A | B |
| Water (desalinized) | 414.0 | |
| Anionic emulsifier | 25.0 | |
| Non-ionic emulsifier | 5.0 | |
| Ammonium peroxydisulphate | 5.0 | |
| Sodium disulphite | 0.5 | |
| Defoamer | 0.5 | |
| Soda lye* (15-%) | 50.0 | |

*Added after the polymerisation in two stages 1st stage ph ~ 5, 2nd stage pH > 10.

Description of the preparation of 1,000 g of dispersion (50-%):

One quart of the monomer mixture (125 g), the internal crosslinking agent, where appropriate, (0.62 or 1.25g) and of the aqueous phase (125 g), were placed in a 2-1 reaction vessel and heated up to 75°–80° C. whilst being strongly stirred (400 rpm). Within this temperature range, the polymerisation reaction started up with a clearly marked heat of reaction.

The remaining three-quarters of the monomer mixture, the internal crosslinking agent, where appropriate, and the aqueous phase in a pre-emulsified condition, were slowly added over a period of 2 hours. In this operation, an internal temperature of about 80° C. was established, which was also maintained for a further hour, after completing the addition, to complete the conversion.

From the polymerisation reaction there resulted 1,000 g of a fine particle, coagulate-free dispersion having a solid content of about 50%. The viscosity of the dispersion was below 1,000 cPs, and the pH value amounted to about 5.

In the case where an external cross-linking agent was introduced, after preparing the dispersion, and in parallel experiments, the prescribed quantity was added by mixing in the appropriate formulation. In both of the parallel experiments, the results were always similar.

The adhesive dispersions obtained by means of the examples were used to secure polyvinylchloride floor coverings onto "Eternit" sheets. The coated parts were stuck together after different exposure times, and in each case the stripping resistance was determined as a measure of the "open time" or available working time.

Test examples were stored at definite temperatures for predetermined periods, as follows:

Sample b

7 × 24 hour at 20° C.

Sample c

1 × 24 hour at 20° C.
5 × 24 hour at 50° C.
1 × 24 hour at 20° C.

The thermal stability was determined as a measure for the temperature stability of the adhesive joint and the tensile shear strength was also determined.

The stripping resistance was determined as follows:

A layer of dispersion adhesive in a thickness of about 0.3 mm was applied to an Eternit sheet (50 × 60 mm), and after an exposure time between 5 and 60 initially minutes a PVC film (40 × 100 m; adhering area surface 40 × 40 mm) was secured to it at a pressure of 0.1 kp/cm² for 10 seconds. Immediately afterwards the adhered joint was stripped at a shearing force of 75 g at 20° C. at a stripping angle of 90°, and the time taken for complete release was measured in minutes.

Determination of the thermal stability

A layer of dispersion adhesive was applied in a thickness of about 0.3 mm to a place of "Eternit", was allowed to dry for 120 minutes, to which a PVC film was stuck at a pressure of 3 kp/cm² for 10 seconds, the overlapping surface of the joint being 4 cm². After one hour at room temperature, a weight of 800 g was suspended from the lower edge of the film projecting beyond the vertically held "Eternit" plate, and at 100° C. the C.

within which the adhesive joint was release was measured in minutes.

Determination of the tensile-shear strength: a layer of dispersion adhesive was applied in a thickness of about 0.3 mm to a plate of "Eternit", was allowed to dry and a PVC film of the same size was applied thereto at a pressure of 3 kp/cm$^2$ for 10 seconds. After being stored at room temperature for 1 hour, the film was moved in a vertical direction through 100 mm per minute and the force necessary to do this was measured in kp/10 cm$^2$.

The examples are set out below in tabular form. From the Table there can be seen the monomer mixture from which the copolymer has been prepared, which cross-linking agent was used and the quantities in which it was added. There are also given the properties of the dispersion adhesive prepared in the individual examples, that is to say the "available working time", the tensile shear strength and its thermal stability.

From the Table it will be seen that the addition of polyaminoamide leads to a substantially more favorable relationship between the open time and the strength. The time interval between the application of the dispersion adhesive and the time when a bond becomes possible, is reduced from 7.5 to 5 minutes by the addition of 2% and 3% of polyaminoamide (compare examples 5 and 1 with examples 2 and 3). The time interval between the application of the adhesive and the time when a bond can still be made initialy increases with the increase of the amount of polyaminoamide (1 and 2%), but thereafter again slightly, diminishes whilst the amount of this added substance becomes 3%. Nevertheless even when the added amount of polyaminoamide is 3% the working time is still satisfactory at 45 minutes; that is to say, such adhesives can be used to make direct bonds even over large areas.

For comparable available working times, the strength values of the adhesive of the invention are always higher. A comparison of Example 4 with Example 6 shows that an increase in the strength values obtained by choosing a different monomer composition (mixture B), but without the addition of polyaminoamide, results in an open time which is too short.

Consequently, the addition of polyaminoamide has the unobvious and unpredictable effect of producing a marked improvement in quality with different monomer mixtures.

| Example No. | | Examples according to the invention | | | | Comparative Examples | |
|---|---|---|---|---|---|---|---|
| | | 1 | 2 | 3 | 4 | 5 | 6 |
| Monomer mixture | | A | A | A | B | A | B |
| (2-chloroacetoxy)-ethylmethacrylate, wt-% | 0.5 | 0.5 | 0.5 | 0.5 | 0.5 | 0.5 | |
| Polyaminoamide MG 150, wt-% | | 1 | 2 | 3 | 2 | — | — |
| Working Time | | 7.5–60 | 5–60 | 5–50 | 10–50 | 7.5–55 | 10–25 |
| Tensile shear strength | b | 102 | 107 | 109* | 109* | 100 | 108 |
| | c | 100 | 105 | 109* | 109* | 95 | 106 |
| Thermal stability | b | 6 | 7 | 7.5 | 6.5 | 6.5 | 6.0 |
| | c | 9.0 | 11 | 10.5 | 9.5 | 9.5 | 9.5 |

*Tearing destruction limit of PVC film

We claim:

1. Cold cross-linkable polyacrylic acid ester based adhesives comprising an aqueous dispersion having a solids content of from about 40 to 60 wt. % and a viscosity in the range of from 800 to 100 CPS containing:
   (a) a copolymer prepared from, in wt. %, 85–50 2-ethyl-hexylacrylate, 0–35 n-butylacrylate, 8–12 acrylonitrile, 2–6 acrylic acid, 0.5–2 acrylamide and from 0 to 2 hydroxyalkylmethacrylate and, based on the amount of the aforementioned monomers, from 0.2–3 of a 2-(α-chloroacetoxy) -alkyl-acrylate or methacrylate,
   (b) 1–5 wt. %, based on the weight of the copolymer of a polyaminoamide having a molecular weight of about 1000 to 8000 containing terminal amino groups and
   (c) rosin, or fillers.

2. Cold cross-linkable adhesives as claimed in claim 1, wherein said polyaminoamide is the product produced by the condensation of unsaturated aliphatic acids with polyamines.

3. Cold cross-linkable adhesive as claimed in claim 1, wherein the alkyl group in the 2-(α-chloroacetoxy)methacrylate is ethyl or propyl.

4. Cold cross-linkable adhesive as claimed in claim 1 containing from 0.5 to 2 percent by weight of hydroxy alkylmethacrylate.

* * * * *